S. W. MARTIN.
SCREW-TAP.

No. 177,731. Patented May 23, 1876.

Witnesses:
Donn J. Twitchell
Will H. Dodge

Inventor:
S. W. Martin
by Dodge & Son,
Attys.

UNITED STATES PATENT OFFICE.

SAMUEL W. MARTIN, OF SPRINGFIELD, OHIO, ASSIGNOR OF ONE-HALF HIS RIGHT TO PHINEAS P. MAST, OF SAME PLACE.

IMPROVEMENT IN SCREW-TAPS.

Specification forming part of Letters Patent No. 177,731, dated May 23, 1876; application filed May 3, 1876.

*To all whom it may concern:*

Be it known that I, SAMUEL W. MARTIN, of Springfield, in the county of Clarke and State of Ohio, have invented certain Improvements in Taps for Cutting Screw-Threads, of which the following is a specification:

My invention consists of a tap for cutting screw-threads, having two flat sides with the teeth cut on the opposite edges, as hereinafter more fully set forth.

Figure 1:
Figure 2:
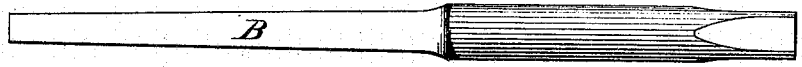
Figure 3:
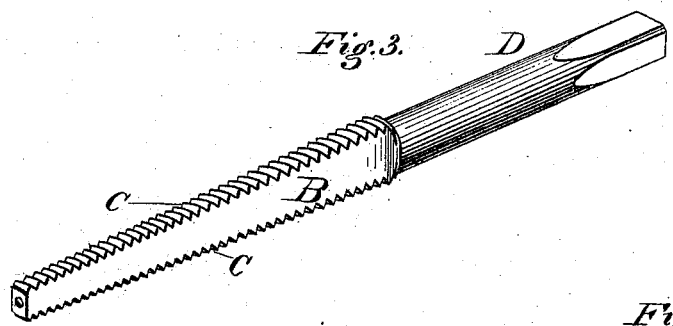
Figure 4:
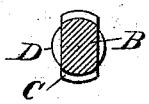

Figure 1 represents the blank from which the tap is made. Fig. 2 represents the same forged into shape as it is before the teeth are cut. Fig. 3 is a perspective view of the tap as it is when finished ready for use. Fig. 4 is a transverse section of the same, and Fig. 5 a transverse section of the tap slightly modified by making the sides concave.

The object of my present invention is to produce a tap for cutting screw-threads that can be made much cheaper, and that can be more easily sharpened than those in general use.

Figure 5:

To construct a tap on my plan I take a round bar of steel and cut it into pieces of the required length, thus forming what may be termed the blank A, as shown in Fig. 1. This blank is then heated, and that portion on which the teeth are to be formed is flattened by hammering or rolling, by which it is reduced in thicknesss about one-third, the metal thus displaced being forced out at the edges, thereby increasing its width proportionately, care being taken in this operation to make it slightly tapering, as shown in Figs. 2 and 3, the part D which forms the shank being left of the original size, except at its opposite end, where it is squared, to enable it to be fitted in and held by a wrench or other tool when in use. After being thus formed it has teeth C cut on its two edges, which are left or formed in the arc of a circle, as shown in Fig. 4. It is then tempered and is ready for use. If preferred its sides may be made concave, as shown in Fig. 5, by which a little more rake is given to the front edges of the teeth, but this I do not find necessary, as I find the flat sides to work well in practice. When the tap becomes dull from use all that is necessary in in order to sharpen it is to grind the flat sides, which can be done on an ordinary grindstone.

This plan of constructing taps is exceedingly simple and cheap, and a tap thus made operates in a most satisfactory manner, and one of its great advantages is the ease with which it can be sharpened.

I am aware that a tap has been made round with longitudinal grooves in its sides, and I do not claim such; but What I do claim is—

A screw-cutting tap, consisting of a round rod flattened on its sides, having teeth formed on the edges thereof, as shown and described.

SAMUEL W. MARTIN.

Witnesses:
J. J. HAMA,
OSCAR S. MARTIN.